Nov. 12, 1940.  W. R. WILEY  2,221,123
TRUNK LID SUPPORT
Filed Aug. 26, 1937
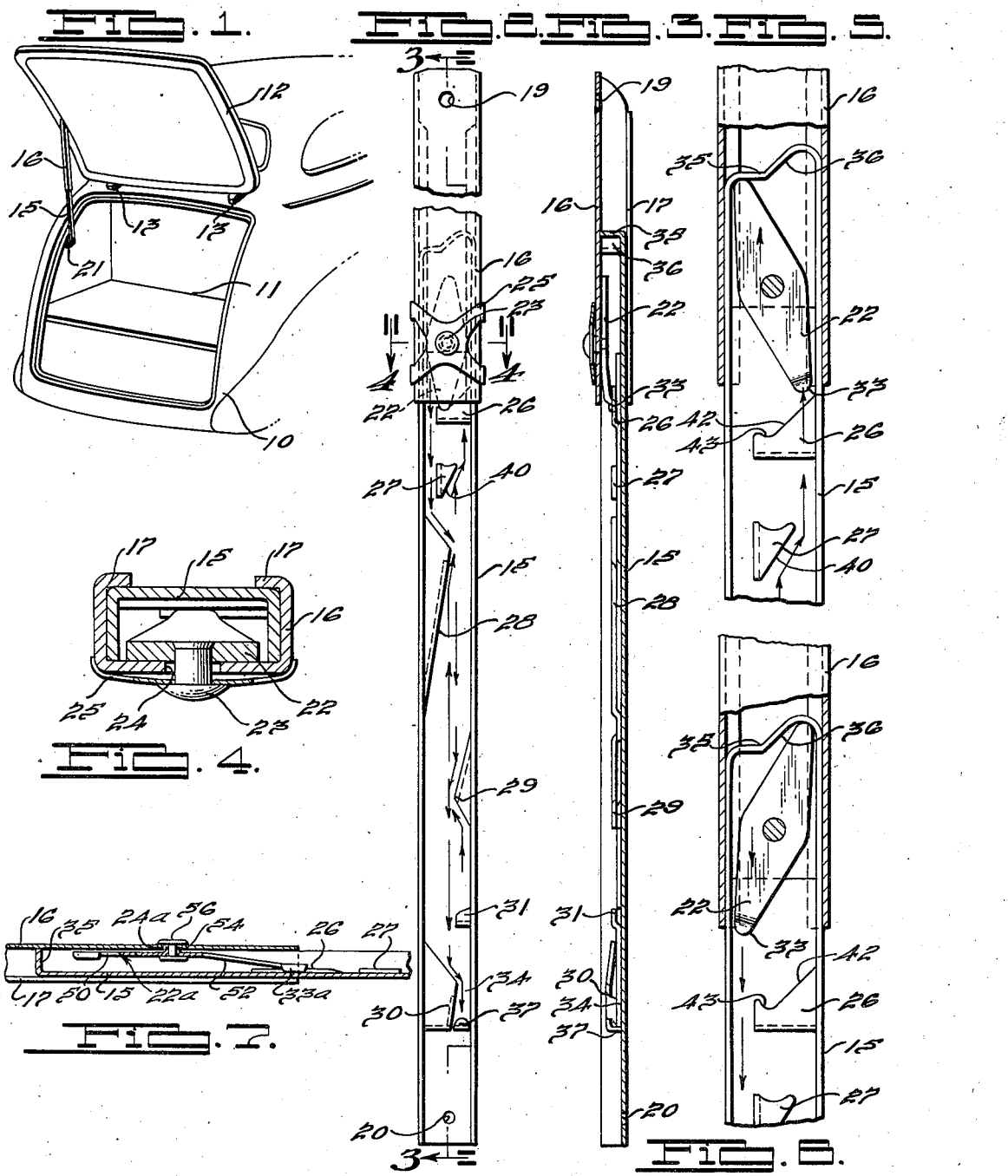
INVENTOR
William R. Wiley.
BY
Harness, Dickey & Pierce.
ATTORNEYS.

Patented Nov. 12, 1940

2,221,123

UNITED STATES PATENT OFFICE 2,221,123

TRUNK LID SUPPORT

William R. Wiley, Detroit, Mich.

Application August 26, 1937, Serial No. 160,991

4 Claims. (Cl. 217—60)

This invention relates generally to lid or cover supports. It is particularly adaptable for use as a trunk lid supporting arm for supporting the rear lid or deck cover of an automobile trunk or rear compartment.

Supports of this general type preferably include mechanism of such nature that when the deck door or trunk lid with which the device is associated is elevated to a predetermined point, return movement will effect a locking of the mechanism and retain the lid in elevated position. When the lid is again slightly elevated, the second elevation thereof serves to release the locking mechanism and permit return of the lid to closed position.

It is a general object of the present invention to provide a trunk lid support mechanism which is exceedingly simple in construction and which is so constructed that it serves to follow the above enumerated cycle of movements.

Still further, the present invention contemplates the provision of a trunk lid support which comprises a pair of telescoping members interconnected together for slidable movement, both of said members preferably being formed of sheet metal parts. The invention contemplates the provision of a dog or catch carried by one of the members which catch is mounted for pivotal movement and at the same time is so mounted that it may move bodily out of its plane of pivotal movement, that is, the catch member is susceptible of movement in two separate directions, one of the directions of movement being substantially perpendicular to the other. In the form of the invention disclosed, it is considered an important feature of applicant's invention that the locking catch is mounted for free pivotal movement and resiliently movable in a plane perpendicular to such pivotal movement, the latter movement being resiliently resisted in order to maintain the device in positive engagement with the various stop members for locking the device in predetermined position.

It is a further object of the present invention to provide a device which is exceedingly simple in construction, one which will not rattle during use, and one which is virtually fool-proof in operation. Still further, the present invention contemplates the provision of a construction which is rugged and yet at the same time simple, compact, neat appearing, and exceedingly economical to manufacture.

Many other and further objects, advantages, and features of the present invention will become more clearly apparent from the following specification when considered in connection with the accompanying drawing forming a part thereof.

In the drawing:

Figure 1 is a rear fragmentary perspective view of an automotive vehicle body having a rear compartment and utilizing the trunk lid support of the present invention for supporting the door thereof;

Fig. 2 is a side elevational view of the improved trunk lid support illustrating the parts thereof in substantially the position shown in Fig. 1;

Fig. 3 is a longitudinal sectional view taken substantially on the line 3—3 of Fig. 2 illustrating in detail the manner in which the parts are associated;

Fig. 4 is an enlarged transverse sectional view taken substantially on the line 4—4 of Fig. 2 illustrating in detail the manner in which the members forming the trunk lid support are assembled in telescoping relation;

Fig. 5 is an enlarged fragmentary sectional view illustrating the device in the extreme upraised position;

Fig. 6 is an enlarged fragmentary sectional view similar to Fig. 5 illustrating the device at the beginning of its downward or unlocking movement; and, Fig. 7 is an enlarged fragmentary sectional view taken longitudinally through a prop of the same construction as shown in the preceding views except that a different form of dog is provided.

With more particular reference to the drawing, it will be readily appreciated that but one relatively specific embodiment of the invention is disclosed therein and that this embodiment is merely illustrative of the generic inventive concept presented.

While it will be readily appreciated that devices of this general character will find wide and practical utility in many and various different fields, the primary application of the present invention is in connection with automotive vehicle bodies for serving to retain the trunk lid or rear deck door in elevated position or portions of the hood in elevated position.

In Figure 1 of the drawing, a conventional automotive vehicle body 10 is shown which includes a built in trunk or compartment 11 at the rear thereof. As is usual in constructions of this general character, the trunk compartment 11 is adapted to be closed by means of a lid or door 12 pivotally connected to the body by means of hinges 13. In the disclosure of Figure 1, applicant's improved trunk lid support is utilized for retaining the trunk lid 12 in predetermined elevated position. This support comprises a pair of members 15 and 16 which are preferably formed from sheet metal bent to generally channel section. The inner member 15 comprises a channel section member slightly smaller than the outer member 16 and as is clearly seen in Figure 4, the marginal portions 17 of the legs of the channel 16 are bent to over-lie the base of the channel member 16 in order to lock the parts in predetermined transverse position with respect to each other and at the same time permit relatively free telescoping of one of the channel members with respect to the other.

The channel member 16 is provided with an aperture 19 at its upper end which is preferably pivotally connected to the trunk lid with which the device is to be associated and the lower end of the channel member 15 is provided with a similar aperture 20 which may serve to provide a pivotal connection between this member and a suitable bracket 21 secured to the body of the vehicle.

The channel member 16 has a dog or catch 22 pivotally mounted therein by means of a rivet 23 which passes through an aperture 24 formed in the base wall of the channel. This aperture is preferably slightly larger than the shank of the rivet 23 in order that the dog 22 will not only be mounted for pivotal movement but may tilt bodily as hereinafter described in detail. As will hereinafter be apparent, the ability of the dog 22 to both pivot and tilt or move bodily because of this connection enables the prop to be constructed without cut-outs or islands as in some previously suggested constructions, thus enabling a prop of maximum strength to be made with a minimum of material. This is particularly true when the members 15 and 16 are of channel shape as shown arranged in face-to-face relationship as the overlapping portions combine to form a box section. Any suitable means may be provided in forming the dog 22 and yieldably urging it towards its normal or non-tilted position, but as a matter of illustration in the particular embodiment shown the dog is rigid and a four prong spring member 25 is retained in position by the head of the rivet and has arms which are bent to lie closely adjacent the surface of the channel member 16. It will be seen that this spring member serves to resiliently resist tilting or movement of the dog member in any plane except the plane in which the dog member moves during pivotal movement. The channel member 15 is provided with a locking stop 26, a safety catch 27, an auxiliary catch 31 and a plurality of guiding cams 28, 29 and 30 which may be formed either integrally with the bottom wall or floor of the channel 15 or separately therefrom and welded or otherwise secured in place, but in the form of the invention shown in Figs. 1 to 6, inclusive, are constructed separately from the channel member 15 and are welded to the base wall thereof. The dog member 22 is of preferably substantially symmetrical shape and has the lower end thereof offset downwardly to provide a projecting portion 33 adapted to engage the various stop members and guiding cams formed in the base of the channel member 15. The upper end of the channel member 15 is preferably closed by means of an integrally formed upwardly bent transversely flat portion 35 at the lefthand side thereof as viewed in Figs. 5 and 6 and a cam surface 36 directed upwardly to the right therefrom which functions in the manner hereinafter described in detail.

The four-pronged spring 25 serves to retain the projection 33 on the dog 22 resiliently against the base of the channel 15 during relative telescoping movement of the channel members 15 and 16.

The device is exceedingly simple in operation and the movements which inherently take place therein will be clearly obvious from the following description.

When the trunk lid 12 is in closed position, the channels 15 and 16 will be telescoped together in such a manner that the offset end portion or projection 33 on the dog 22 will lie in a position adjacent the extreme lower end of the channel 15. An upwardly projecting stop 37 is provided on the floor of the channel 15 at this point which serves to engage the dog member 22 and prevent disassembly of the channels 15 and 16 when the device is being handled before assembly in an automobile or the like. When the device is assembled in an automobile the stop 37 does not actively function. Immediately above the stop 37 the floor of the channel 15 is raised as at 34 so as to engage the end portion 33 of the dog 22 when the device is in normal closed position so as to tilt the dog 22 against the action of the spring 25, thus precluding the possibility of the parts rattling when in this position.

When the parts are in closed position and the trunk lid 12 is raised, the end portion 33 of the dog 22 will move upwardly along substantially the line indicated by the upwardly pointed arrows in Fig. 2, first tilting to pass over the auxiliary stop 31, then being directed to the left as viewed in Fig. 2 by the lower face of the cam 29, then being directed to the right as viewed in Fig. 2 by the lower face of the cam 28, and as it continues to move further upwardly, moved to the extreme righthand side of the channel 15 by contact with the cam 40 formed on the lower righthand face of the safety catch 27. This cam surface 40 effects a pivotal movement of the dog member 22 in a counter-clockwise direction to move the same into substantially the position of inclination shown in Fig. 5 in which the end portion 33 is at the extreme righthand side of the channel 15. It is apparent that upon further upward movement of the lid 12 the end portion 33 on the dog member will snap over the stop member 26, the spring 25 yielding to permit tilting movement of the dog 22 to effect this result, and almost as soon as this dog has passed over the stop member 26, the upper end of the dog will abut against the transversely flat lefthand portion 35 of the closed upper end of the channel member 15 thus precluding further elevation of the lid at this time. If now the trunk lid is lowered slightly, the projection or end portion 33 of the dog 22 will contact the cam surface 42 formed on the upper side of the stop member 26 and effect a pivotal movement of the dog member in a clockwise direction to bring the parts into substantially the position shown in Fig. 2 in which position the end portion 33 of the dog 22 seats in the depression or notch 43 at the lower end of the cam surface 42, thus locking the trunk lid in substantially the elevated position shown in Fig. 1.

If now the trunk lid 12 is now again elevated, the upper end of the dog member 22 will be in a position to and will engage the cam surface 36 formed at the righthand side of the closed upper end of the channel member 15, which will cause a clockwise movement of the dog 22 and move the projection 33 on its lower end to the extreme lefthand side of the channel 15 as viewed in Fig. 5. This upward movement of the trunk lid at this time may be extremely short and is merely sufficient to effect the necessary pivotal movement of the dog member 22.

As soon as this last described movement of the dog member 22 has occurred, the trunk lid may be lowered and the projection 33 on the dog member 22 will move downwardly along the line indicated by the downwardly directed arrows in Fig. 2, it being first engaged by the upper surface of the cam member 28 to cause the dog 22 to rotate in a counter-clockwise direction of rotation a sufficient amount to permit the end 33 to pass downwardly thereby. Further downward movement of the lid 12 causes the end 33 to be engaged by the upper face of the cam 29 so as to again move the dog 22 in a clockwise direction of rotation a sufficient distance to clear the catch 31 and upon further downward movement the end 33 will finally engage the upper surface of the cam 30 which will again pivot the dog member 22 in a counter-clockwise direction of rotation and force the projection 33 thereof up on to the raised portion 34 of the floor of the channel 15 immediately above the stop 37, in which position the dog is properly positioned to again function in the proper manner when the lid 12 is again raised and is held against rattling in the meantime.

The safety catch member 27 not only serves to provide a cam surface 40 for guiding the projection 33 of the dog member 22 to the righthand side of the channel 15 during the final upward movement of the dog member 22, but also serves to insure latching of the device if for any reason the lower end of the dog member 22 should inadvertently slip out of the notch or depression 43 formed in the limit stop 26 when the lid is raised.

The auxiliary stop 31 is provided solely as a matter of convenience so that as soon as the operator of the lid 12 raises the lid 12 a short distance the dog 22 will be in a position to catch the projection 31 and hold the lid in partially open position, thus permitting the operator to release his grip on the usual handle and put his hands under the lower edge of the lid 12 so as to more easily complete the opening movement of the lid. For this reason it is not essential to the proper operation of the main part of the device but is provided simply as a matter of convenience as above mentioned.

The cam surface 28 is particularly provided for causing re-cycling of the dog 22 in cases when the lid is allowed to lower from its extreme upper position and it is desired to again latch it in its extreme upper position without necessitating the lid being first brought to closed position. In this respect it will be understood that when the lid is being lowered from its fully open position, during the initial lowering movement the end 33 of the dog 22 moves down the lefthand side of the channel 15 to the left of the catch 26 and safety catch 27, as viewed in Fig. 2, and then strikes the upper cam surface of the cam 28 and is moved to the right thereby. At such time, that is, where the end 33 has been moved to the right by the upper surface of the cam 28 during closing movement of the lid 12 and the movement of the lid 12 is reversed, the end 33 of the dog 22 in moving upwardly will be moved to the extreme righthand side of the channel by the cam surface 40 and will again ride over the catch 26 to latched position.

The cam surface 29 is, of course, provided so as to move the lower projecting end 33 of the dog 22 a sufficient amount towards the lefthand side of the channel 15 during closing movement of the lid 12 so that it will clear the auxiliary stop 31 during the closing movement in event the end 33 thereof has been moved sufficiently to the right to engage it during closing movement. Such movement of the dog 22 might occur if the lid was permitted to drop after the end 33 had engaged the cam surface 40 during an opening movement of the lid 12 insufficient to pass the end 33 of the dog over the stop 26. The use of the cam 29 also makes it possible for a person to lift the lid 12 to a position which may be, as a matter of illustration, half way open so as to permit the insertion of a bag or the like, and then allow the lid to close without necessitating moving the lid to fully open position.

The cam 28 is provided not only to obtain re-cycling at the upper extremity of movement of the lid 12 as previously explained but also so that during upward movement of the lid 12 the lower projecting end 33 of the cam 22 will be moved to the right as viewed in Fig. 2 a sufficient distance to engage the cam surface 40 and prevent the possibility of the projection 33 from riding up the lefthand side of the channel 15 between the safety catch 27 and the lefthand wall thereof. It will be apparent from the above that in event the auxiliary stop 31 is eliminated it is also possible to eliminate the cam 29 without effecting the operation of the device in any respect except that concerned with the functioning of the auxiliary stop 31.

In Fig. 7 a modified form of construction for the dog 22 is shown, all of the rest of the structure remaining identical to that described in connection with the preceding figures except that the various cams 26, 27, etc. are formed by striking the metal of the floor of the channel 15 upwardly to provide the same instead of forming them separately and then welding them in place. In Fig. 7 the dog is indicated generally at 22a. In this case instead of forming the dog 22a as a rigid member and providing a yielding mounting for it as in the preceding construction the dog 22a is formed of spring material. One arm 50 thereof is flat and arranged to lie substantially in contact with the floor of the channel 16 but the oppositely extending arm 52 thereof is directed at an angle to the arm 50 so that its end 33a is resiliently pressed against the floor of the channel 15 upon which the various cams and stops are provided. The end portions of the arms 50 and 52 are preferably thickened by cupping as indicated. At its center the arm 22a is provided with a collar 54 which projects through and is pivotally received in the opening 24a in the channel 16, corresponding to the opening 24 previously described, and a rivet 56 passing through the collar 54 prevents displacement of the collar 54 from the opening 24a.

It will be understood that the effect of the dog 22a in Fig. 7 is the full equivalent of the dog 22 shown and described in connection with the preceding figures, the only difference being that instead of the entire dog tilting in order to permit the end 33a thereof to pass over certain of the cam surfaces, the arm 52 in this case bends or springs to permit an equivalent action of the end 33a. Accordingly, it will be recognized that the device shown in Fig. 7 functions in identically the same manner as in the previously described construction.

From the above description, it is believed apparent that the device is extremely simple and fool-proof in construction, easy and cheap to manufacture and it is noted that all of the working parts of the device inherently enclosed between interlocking telescoping channel members thus protect the operating mechanism and at the same time provide an extremely simple and neat appearing trunk lid support.

While but one form of the invention has been illustrated and described, many other and further modifications thereof falling within the scope of the invention as defined in the subjoined claims will become clearly apparent to those skilled in the art.

What is claimed is:

1. A lid support or the like comprising a pair of telescoping channel-shaped members generally of like length and one mounted within the other in reverse position so as to provide a pair of spaced walls and a space therebetween, a dog pivotally mounted intermediate its ends on one wall of said members, said dog being formed of resilient material having one end thereof offset with respect to the other end thereof and slidably and resiliently contacting the other wall, a locking stop having a shoulder portion projecting from said other of said members in the path of movement of said dog, said dog being so constructed and arranged as to slip over said stop in resilient engagement therewith upon movement in one direction and to engage said shoulder and lock said members against movement in the opposite direction, means to release said dog from engagement with said shoulder upon further movement of said dog in said one direction whereby said members may be moved relative to each other in said opposite direction, and means cooperating with said dog to vary the pivotal position thereof to return said dog to its initial position relative to said stop.

2. A lid support or the like comprising a pair of telescoping channel-shaped members generally of like length and one mounted within the other in reverse position so as to provide a pair of spaced walls and a space therebetween, a dog pivotally mounted intermediate its ends on one wall of said members, said dog being formed of resilient material having one end thereof offset from the other end thereof and slidably and resiliently contacting the other wall, a locking stop having a shoulder portion projecting from said other of said members in the path of movement of said dog, said dog being so constructed and arranged as to slip over said stop in resilient engagement therewith upon movement in one direction and to engage said shoulder and lock said members against movement in the opposite direction, means to release said dog from engagement with said shoulder upon further movement of said dog in said one direction whereby said members may be moved relative to each other in said opposite direction, and means cooperating with said dog to vary the pivotal position thereof to return said dog to its initial position relative to said stop.

3. A lid support or the like comprising a pair of telescoping channel-shaped members generally of like length and one mounted within the other in reverse position so as to provide a pair of spaced walls and a space therebetween, a dog pivotally mounted intermediate its ends on one wall of said members, said dog being formed of resilient material having one end thereof offset from the other end thereof and slidably and resiliently contacting the other wall, a locking stop having a shoulder portion projecting from the base of said other of said members in the path of movement of said dog, said dog being so constructed and arranged as to slip over said stop in resilient engagement therewith upon movement in one direction and to engage said shoulder and lock said members against movement in the opposite direction, means to release said dog from engagement with said shoulder upon further movement of said dog in said one direction whereby said members may be moved relative to each other in said opposite direction, and means cooperating with said dog to vary the pivotal position thereof to return said dog to its initial position relative to said stop.

4. A lid support or the like comprising a pair of telescoping channel-shaped members generally of like length and one mounted within the other in reverse position so as to provide a pair of spaced walls and a space therebetween, an elongated dog pivotally mounted intermediate its ends on one wall of said members, said dog being formed of resilient material having one end thereof offset from the other end thereof and slidably and resiliently contacting with the other of said members, a locking stop having a shoulder portion projecting from said other of said members in the path of movement of said dog, said dog being so constructed and arranged as to slip over said stop in resilient engagement therewith upon movement in one direction when said dog is in a predetermined pivotal position and to engage said shoulder and lock said members against movement in the opposite direction, means cooperating with said dog upon further movement thereof in said one direction to vary said predetermined pivotal position to release said one end of said dog from engagement with said shoulder whereby said members may be moved relative to each other in said opposite direction, and cam means cooperating with said dog to vary the pivotal position thereof to return said dog to said predetermined pivotal position relative to said stop.

WILLIAM R. WILEY.

CERTIFICATE OF CORRECTION.

Patent No. 2,221,123.  November 12, 1940.

WILLIAM R. WILEY.

It is hereby certified that error appears in the printed specification of the above numbered patent requiring correction as follows: Page 4, second column, lines 42 and 43, claim 4, for the words "with the other of said members" read --the other wall--; and that the said Letters Patent should be read with this correction therein that the same may conform to the record of the case in the Patent Office.

Signed and sealed this 31st day of December, A. D. 1940.

(Seal)

Henry Van Arsdale,
Acting Commissioner of Patents.